United States Patent
Zhu et al.

(10) Patent No.: US 12,081,880 B2
(45) Date of Patent: Sep. 3, 2024

(54) IMAGE SUPER-RESOLUTION WITH REFERENCE IMAGES FROM ONE OR MORE CAMERAS

(71) Applicant: SAMSUNG ELECTRONICS CO., LTD., Suwon-si (KR)

(72) Inventors: Jing Zhu, Jackson Heights, NY (US); Wenbo Li, Santa Clara, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 17/493,268

(22) Filed: Oct. 4, 2021

(65) Prior Publication Data
US 2022/0368829 A1 Nov. 17, 2022

Related U.S. Application Data

(60) Provisional application No. 63/187,301, filed on May 11, 2021.

(51) Int. Cl.
*H04N 23/951* (2023.01)
*G06T 5/20* (2006.01)
(Continued)

(52) U.S. Cl.
CPC ............ *H04N 23/951* (2023.01); *G06T 5/20* (2013.01); *G06T 5/50* (2013.01); *G06T 5/75* (2024.01); *G06T 2207/20016* (2013.01)

(58) Field of Classification Search
CPC ........ H04N 23/80; H04N 23/70; H04N 5/253; H04N 25/68; H04N 23/951; G06T 5/00;
(Continued)

(56) References Cited

U.S. PATENT DOCUMENTS 7,545,965 B2 *  6/2009  Suzuki ...................... G06T 5/90
                                                            382/128
8,339,512 B2 * 12/2012  Ota ........................... G06T 5/20
                                                            348/441
(Continued)

FOREIGN PATENT DOCUMENTS

WO    WO-2020187042 A1 *  9/2020

OTHER PUBLICATIONS

Dong et al. "Learning a deep convolutional network for image super-resolution." Computer Vision—ECCV 2014: 13th European Conference, Zurich, Switzerland, Sep. 6-12, 2014, Proceedings, Part IV 13. Springer International Publishing, 2014. (Year: 2014).*

(Continued)

*Primary Examiner* — Edward F Urban
*Assistant Examiner* — Benedict E Lee
(74) *Attorney, Agent, or Firm* — Sughrue Mion, PLLC

(57) ABSTRACT

A super resolution is produced using multiple reference images. Reference images are upsampled and blurred as needed for comparison between images of different resolution. Patches in blurred images are searched to find those patches which can be assembled into vectors for improving feature content over multiple resolution levels. The searches are based on similarity maps. The assembled vectors are concatenated with one or more other vectors, up-converted and then passed through convolutional layers to obtain new feature vectors. A final feature vector is passed through a convolutional layer to obtain the super resolution image.

16 Claims, 17 Drawing Sheets

(51) Int. Cl.
*G06T 5/50* (2006.01)
*G06T 5/75* (2024.01)

(58) Field of Classification Search
CPC .. G06T 5/004; G06T 5/20; G06T 5/50; G06T 2207/20016; G06T 3/40; G06T 3/4053
See application file for complete search history.

(56) References Cited

U.S. PATENT DOCUMENTS

| | | | |
|---|---|---|---|
| 9,485,432 B1 * | 11/2016 | Medasani | H04N 23/951 |
| 9,635,246 B2 * | 4/2017 | Shroff | G06T 3/4053 |
| 9,865,036 B1 | 1/2018 | Liu et al. | |
| 10,198,801 B2 * | 2/2019 | Yang | G06V 10/7753 |
| 10,284,810 B1 * | 5/2019 | Shoa Hassani Lashdan | H04N 7/0127 |
| 10,650,495 B2 * | 5/2020 | Zhang | G06F 18/213 |
| 10,885,608 B2 | 1/2021 | Zhang et al. | |
| 10,970,820 B2 | 4/2021 | El-Khamy et al. | |
| 11,068,741 B2 * | 7/2021 | Wang | G06T 7/50 |
| 11,321,822 B2 * | 5/2022 | Xin | G06N 7/01 |
| 2020/0151852 A1 | 5/2020 | Wang et al. | |
| 2020/0193635 A1 | 6/2020 | Su et al. | |
| 2020/0257936 A1 * | 8/2020 | Ma | G06V 10/94 |
| 2020/0311871 A1 | 10/2020 | Yu et al. | |
| 2020/0402206 A1 | 12/2020 | Ichihashi et al. | |
| 2021/0065337 A1 | 3/2021 | Bai | |
| 2021/0133926 A1 | 5/2021 | Jia | |
| 2022/0253977 A1 * | 8/2022 | Lyu | G06T 7/40 |
| 2023/0126178 A1 * | 4/2023 | Fu | G06V 10/82 382/103 |

OTHER PUBLICATIONS

Yang et al. "Image super-resolution via sparse representation." IEEE transactions on image processing 19.11 (2010): 2861-2873. (Year: 2010).*

Zhang et al. "Single image super-resolution with multiscale similarity learning." IEEE transactions on neural networks and learning systems 24.10 (2013): 1648-1659. (Year: 2013).*

Communication dated Aug. 1, 2022, issued by the International Searching Authority in counterpart International Application No. PCT/KR2022/005952 (PCT/ISA/220, 210, 237).

Zhang et al., "Single Image Super-Resolution With Multiscale Similarity Learning," IEEE Transactions on Neural Networks and Learning Systems, vol. 24, No. 10, Oct. 2013, Total 12 pages.

* cited by examiner

LS Image

BIR Image

IR Image

HR Image

BHR Image

LS Image

SR Image 5-1 (Example Of SR Image 2-5)

IMAGE SUPER-RESOLUTION WITH REFERENCE IMAGES FROM ONE OR MORE CAMERAS

CROSS REFERENCE TO RELATED APPLICATION

This application claims benefit of priority of U.S. Provisional Application No. 63/187,301 filed May 11, 2021, the contents of which are hereby incorporated by reference.

FIELD

The present disclosure is related to generation of a super resolution image from a source image and multiple reference images.

BACKGROUND

A super resolution image is rendering of a source image with additional information. Generally, the additional information is related to texture.

SUMMARY

A problem exists in providing satisfactory information in low resolution images, such as a wide-angle image captured by a mobile device. Embodiments provide algorithms and devices for enhancing low resolution source images using multiple reference images.

More than 90% of people take photos using a phone, and most of recent advanced mobile devices are embedded with multiple cameras. Embodiments disclosed herein provide super-resolution models which take advantage of the multiple images from the multiple phone cameras.

Also, devices are embedded with high-resolution screens, and thus high-resolution images can make use of these screens to give an improved display, especially when users show the images on UHD (ultra high definition) TV or a high resolution computer monitor.

High-resolution images carry clearer content with fine details, which can help discover interesting moments or objects from the scene.

Provided herein is a method of forming a super resolution image, the method including: generating a plurality of auxiliary images from a plurality of original images; obtaining a plurality of feature vectors from the plurality of original images and from the plurality of auxiliary images; combining, based on a plurality of indices, a higher resolution feature vector with a lower resolution feature vector, and generating the super-resolution image based on the combined feature vectors.

In some embodiments, the method further includes: dividing the plurality of feature vectors into a plurality of patches; and obtaining patch pairs from the plurality of auxiliary images indicating a second plurality of patches of the plurality of original images with matching texture content, wherein the second plurality of patches are associated with one or more higher resolution images of the plurality of original images, the plurality of indices includes a plurality of patch indices, the patch pairs are identified by the plurality of patch indices, and the higher resolution feature vector and the lower resolution feature vector are derived from the plurality of feature vectors at a patch dimension level.

In some embodiments, the plurality of original images includes a low resolution image, a medium resolution image and a high resolution image.

In some embodiments, the plurality of auxiliary images includes a medium resolution image made blurry by a downsample operation and an upsample operation.

In some embodiments, the combining uses a single similarity to assemble an intermediate feature vector and a final feature vector, the plurality of feature vectors includes the intermediate feature vector and the final feature vector, and the combining further includes fusing a final intermediate feature vector with the final feature vector, wherein the final intermediate feature vector is obtained based on an intermediate fusion using the intermediate feature vector.

In some embodiments, the plurality of original images includes a low resolution image, an original medium resolution image and a high resolution image, the plurality of auxiliary images includes a second blurry image and a first blurry image, and the plurality of feature vectors includes a first feature vector and a second feature vector, the method further including: assembling the first feature vector of the high resolution image using features of the second blurry image and based on a first similarity, wherein a first plurality of feature vectors includes the first feature vector; assembling a second feature vector of the original medium resolution image using features of the low resolution image and based on a second similarity, wherein a second plurality of feature vectors includes the second feature vector; fusing the second feature vector with a third feature vector of the low resolution image to obtain a fifth feature vector; fusing the fifth feature vector with a fourth feature vector to obtain the super resolution image, wherein the fourth feature vector is based on the first feature vector and the second feature vector; and outputting the super resolution image to a display device.

In some embodiments, the assembling the first feature vector of the high resolution image includes: downsampling and upsampling the high resolution image to obtain the first blurry image; extracting a first intermediate feature vector from the first blurry image; downsampling and upsampling of the original medium resolution image to obtain the second blurry image; extracting a second intermediate feature vector from the second blurry image; and assembling, based on the first similarity between the first intermediate feature vector and the second intermediate feature vector, a third intermediate feature vector associated with the high resolution image.

In some embodiments, the assembling the second feature vector of a medium resolution image using features of the low resolution image includes: extracting a fourth intermediate feature vector from the low resolution image; assembling, based on the second similarity between the fourth intermediate feature vector and the second intermediate feature vector, two feature vectors, wherein the two feature vectors are: i) the second feature vector associated with the original medium resolution image, and ii) a fifth intermediate feature vector associated with the original medium resolution image and the high resolution image.

In some embodiments, the method also includes: calculating a first similarity map including a plurality of first inner product values, wherein the plurality of first inner product values are based on features extracted from the first blurry image and the second blurry image, wherein the plurality of first inner product values includes the first similarity.

In some embodiments, the method also includes calculating a second similarity map including a plurality of second inner product values, wherein the plurality of second inner product values are based on features extracted from the low resolution image and the second blurry image, wherein the plurality of second inner product values includes the second similarity.

In some embodiments, the low resolution image is a first upsampled version of a source image, wherein the source image is obtained using a wide-angle lens.

In some embodiments, the original medium resolution image is a second upsampled version of a regular resolution image, wherein the regular resolution image is obtained with a typical focal length lens.

In some embodiments, the high resolution image is obtained with a telephoto lens.

In some embodiments, the method also includes training a feature extractor and a super resolution network using the low resolution image, the original medium resolution image and the high resolution image.

In some embodiments, the method also includes dividing the first blurry image into a first plurality of patches including a first patch, wherein the first intermediate feature vector corresponds to the first patch; dividing the second blurry image into a second plurality of patches including a second patch, wherein the second intermediate feature vector corresponds to the second patch; and dividing the high resolution image into a third plurality of patches including a third patch, wherein the first feature vector corresponds to the third patch, wherein the first similarity between the first intermediate feature vector and the second intermediate feature vector, is configured to indicate that the first patch is similar to the second patch, and the assembling the first feature vector of the high resolution image is based on the third patch corresponding with the second patch.

Also provided herein is an apparatus for forming a super resolution image, the apparatus including: one or more memories configured to store instructions; and one or more processors, wherein execution of the instructions by the one or more processors are configured to cause the apparatus to: generate a plurality of auxiliary images from a plurality of original images; obtain a plurality of feature vectors from the plurality of original images and from the plurality of auxiliary images; combine, based on a plurality of indices, a higher resolution feature vector with a lower resolution feature vector, and generate the super-resolution image based on the combined feature vectors.

Also provided herein is a non-transitory computer readable medium configured to store instructions, wherein execution of the instructions by one or more processors of a computer are configured to cause the computer to: generate a plurality of auxiliary images from a plurality of original images; obtain a plurality of feature vectors from the plurality of original images and from the plurality of auxiliary images; combine, based on a plurality of indices, a higher resolution feature vector with a lower resolution feature vector, and generate the super-resolution image based on the combined feature vectors.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Images captured by different cameras have different view ranges, different resolutions and usually same image size.

There are three cameras in an example mobile device (such as a mobile phone): wide-angle (low-resolution wide-range image), Regular (intermediate-resolution middle-range image) and telephoto (high-resolution narrow-range image).

The wide-angle image is referred to herein as a low resolution source image (LS image). The regular resolution image is referred to herein as an intermediate-resolution reference image (IR image). The telephoto image is referred to herein as a high resolution reference image (HR image). Examples of an LS image, IR image and HR image are shown in FIG. 1.

Figure 1:
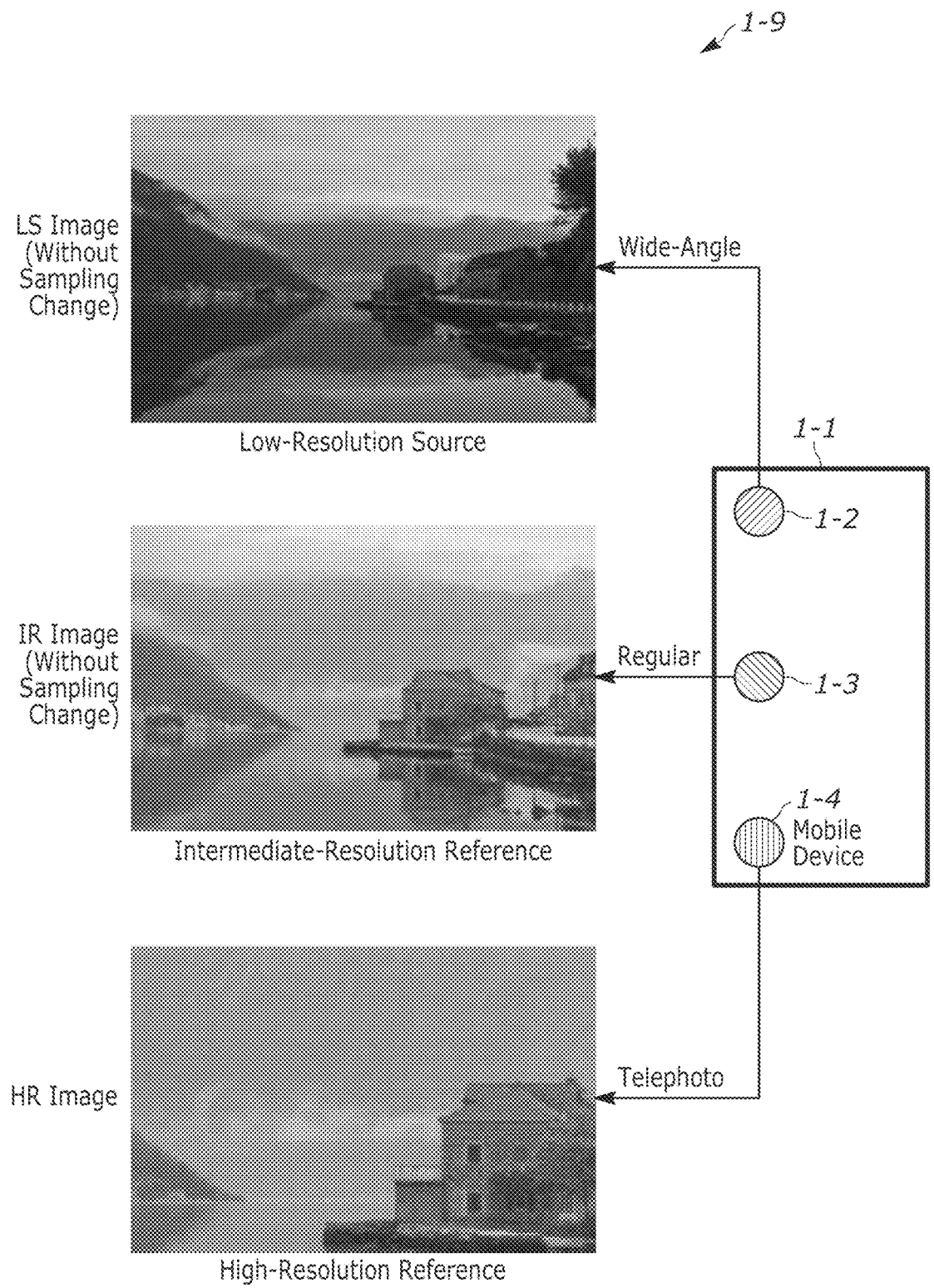
FIG. 1 illustrates a mobile device 1-1 which captures multiple images, according to some embodiments.

FIG. 1 illustrates a mobile device 1-1 equipped with a telephoto lens 1-4, a regular lens 1-3 and a wide-angle lens 1-2. For an example scene, the corresponding images are shown. That is, the LS-image is obtained using the wide-angle lens 1-2, the IR image is obtained using regular lens 1-3 and the HR image is obtained using the telephoto lens 1-4. The low-resolution wide-range image, that is the LS image, contains more information for current scene, which can be used to discover interesting shots or objects. However, the image quality could be limited by the original image lower resolution. Embodiments improve the presentation of the LS image using the super resolution algorithms provided herein.

It is hard to directly generate high-quality high-resolution images from a single image, while images from other cameras (i.e., regular, telephoto) can provide useful information to assist the generation process as the images actually cover some content of the low-resolution one but with higher resolution.

Image super-resolution is a significant problem in the computer vision field. Current existing methods can be categorized as single image super-resolution (SISR) and reference-based image super-resolution (RefSR).

Deep-learning-based single image super-resolution (SISR) methods directly regress a high-resolution (HR) image from the low-resolution (LR) input, which might cause blurry effects.

A deep-learning-based reference-based image super-resolution (RefSR) method may utilize a high-resolution image as reference to enhance the super-resolution process, but they usually are both time- and memory-consuming.

Embodiments are motivated by the fact that most mobile devices are equipped with multiple cameras. Embodiments solve challenges of multiple-reference Image super-resolution (MISR) by providing computationally efficient architectures for obtaining a super resolution image from a source image and multiple reference images. The multiple reference images provide additional relevant information for super-resolution. As mentioned above, the wide-angle images are considered as low resolution source input (LS image), the regular camera images and telephoto camera images are intermediate-resolution reference (IR image) and HR reference (HR image).

Embodiments improve over existing SISR models nor RefSR models which are generally time- and memory-expensive.

In contrast, embodiments provide an effective way to transfer relevant texture from multiple reference images at different feature scales to improve the super-resolution performance.

Also, embodiments provide a progressively learning mechanism by first upsampling the IR image with help from the HR image, and then further boosting the super-resolution of the SR image with information from the upsampled IR image.

Thus, embodiments provide an effective way to transfer relevant texture from multiple reference images at different feature scales to improve the super-resolution performance.

Embodiments include a feature extractor, a super-resolution network and a feature map assemble module. In some embodiments, a model takes a naive upsampled image as IR image, a naive upsampled source image as HR image and outputs a super-resolution (source) image. One example of a naïve upsampling technique is bicubic upsampling.

In order to better calculate the similarity between the reference images (also referred to herein as "auxiliary images") and the source image, the reference images are naïve downsampled-then-upsampled. The resulting reference images are referred to as blurred IR image, that is BIR image and blurred HR image, that is BEM image. The effect matches the same blurry level to the LS image, which is a naive upsampled source image.

A similarity between a patch A and a patch B of features x and y may be found using Eq. 1, where <u,v> is inner product.

$$m_{\{x,y\}}^{\{A,B\}} = \left\langle \frac{x^A}{\|x^A\|}, \frac{y^B}{\|y^B\|} \right\rangle \quad \text{Eq. 1}$$

Similarity map M1 and similarity map M2 are generated using Eq. 1.

A selection of a patch index $P_i$ of a patch B in a vector y using a similarity map to best match a patch A in vector x, y is performed using the argmax function as shown in Eq. 2.

$$P_i = \underset{B}{\operatorname{argmax}} m_{\{x,y\}}^{\{A,B\}} \quad \text{Eq. 2}$$

In some embodiments, the feature extractor contains three convolution layers that learn features from the input images. The features are used for similarity calculations, relevant feature assembly and super-resolution generation.

Multi-scale features are extracted from the five input images (LS image, IR image, BIR image, HR image and BHR image).

After extracting the features, feature maps are split into patches. Then, patch-wise similarity maps among reference images (i.e., IR image and HR image) and source image are computed by the normalized inner product based on the features of BIR image, BHR image, and the source image (LS image). Two convolutional layers are added to connect the feature extractor and the super-resolution network.

The super-resolution network includes Up-Cony blocks (e.g., 40 RCABs and a sub-pixel convolution layer) to upscale the feature map by a factor of 2. The super-resolution network also includes a convolution layer after each Up-Cony block and feature concatenation.

The assembled feature maps from the previous step are concatenated to the features generated in the super-resolution network at the corresponding scale so that relevant textures from reference images can be used for better image generation.

For each patch on the source image feature map, the feature of the most relevant patch from IR image and the HR image (i.e., the one with highest similarity score) is be used to construct the textured-enhanced feature maps.

Multi-scale features are reassembled based on the similarities calculated at the smaller scale for effectiveness, and then the multi-scale features are fed into the super-resolution network as part of the generation process of the SR image.

Some embodiments, based on the characteristics and relationship among the reference images and the source image, provide a progressive feature transferring mechanism. The progressive feature transfer first upscales the IR image using information from the HR image, and then upscales the LS image with the upscaled IR image features.

For example, considering that the content in HR image is closer to the IR image, a similarity map M1 captures this relationship. The content in IR image is closer to the LS image and a similarity map M2 captures this relationship. Embodiments extract the relevant features from the HR image based on a similarity map (M1) between BIR image and the BEM image. The selected features are then fed into a super-resolution network at the intermediate level to further improve the resolution at the intermediate level.

Then a similarity (i.e., inner product) is computed to form the similarity map M2 using the features of the LS image and BIR image. M2 is used to identify features to bring from the super-resolution network at the intermediate level into the source image super-resolution network.

The source image super-resolution network concatenates and feeds forward the assembled IR image features at different scales. A convolutional layer then outputs a super resolution image (SR image) as the high-resolution image for a given source image (LS image).

Embodiments are now explained in further detail with respect to FIGS. 2-10.

Figure 2:
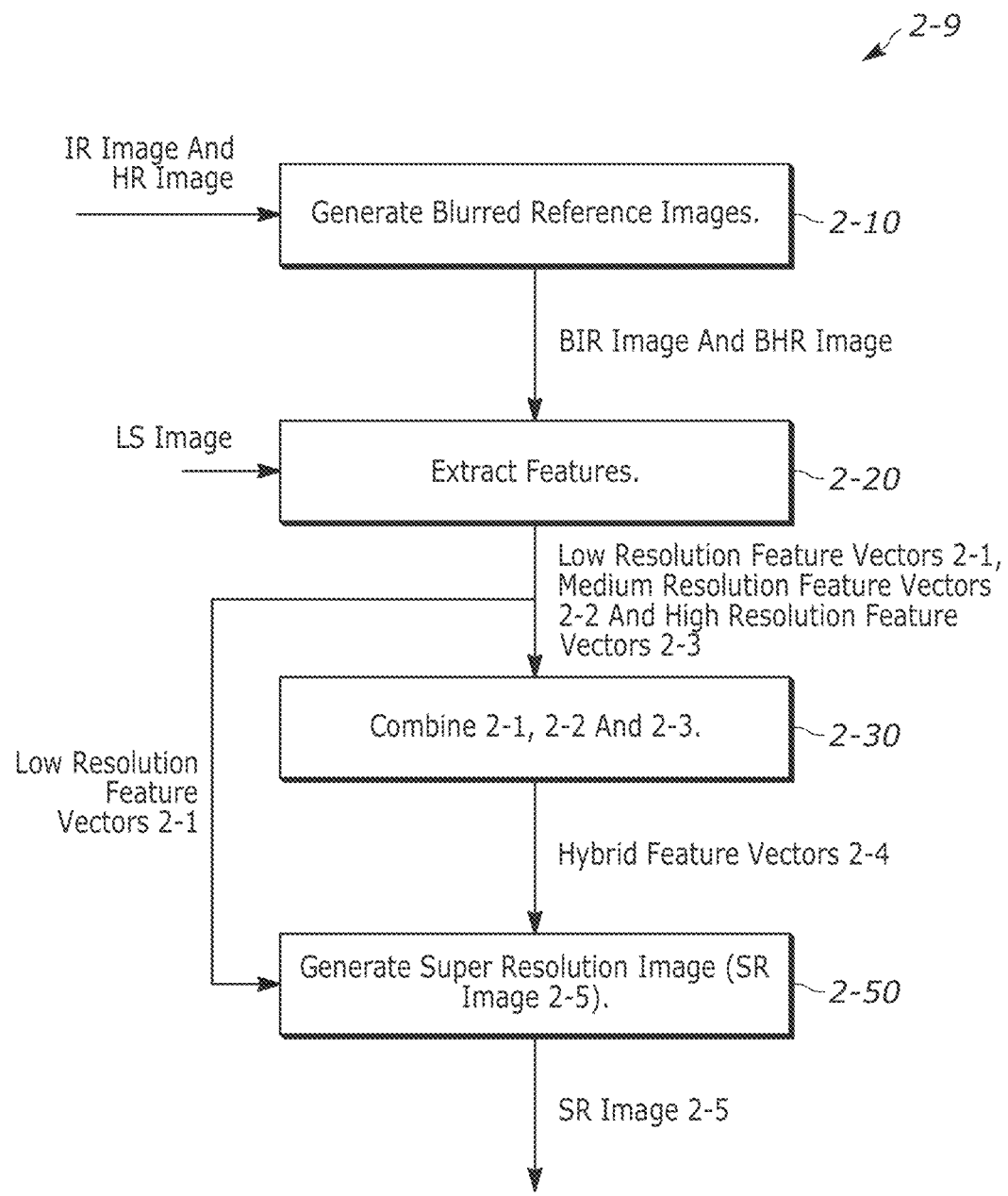
FIG. 2 illustrates a logic flow for producing a super resolution image based on multiple reference images, according to some embodiments.

FIG. 2 illustrates logic 2-9 for obtaining an SR image 2-5 from the LS image, the IR image and the HR image. At operation 2-10, blurred reference images BIR image and BHR image are generated. The blurring can be obtained by first applying a naïve downsampling operation and then a naïve upsampling operation. At operation 2-20, features are extracted using a feature extractor for each of the five images. The same feature extractor may be applied to all five images.

Figure 7:
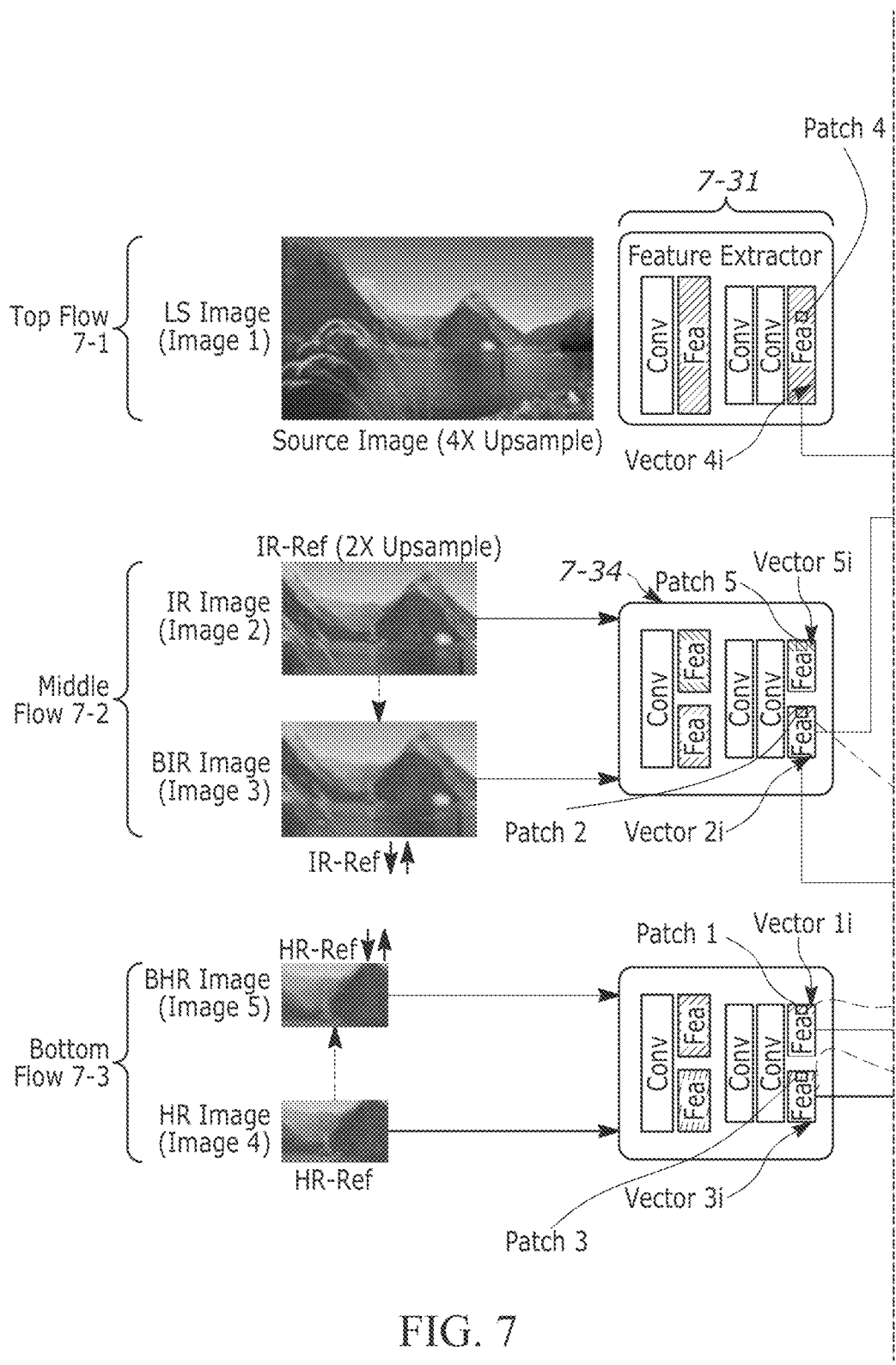
FIG. 7 illustrates a neural network for producing a super resolution image, according to some embodiments.
Figure 7:
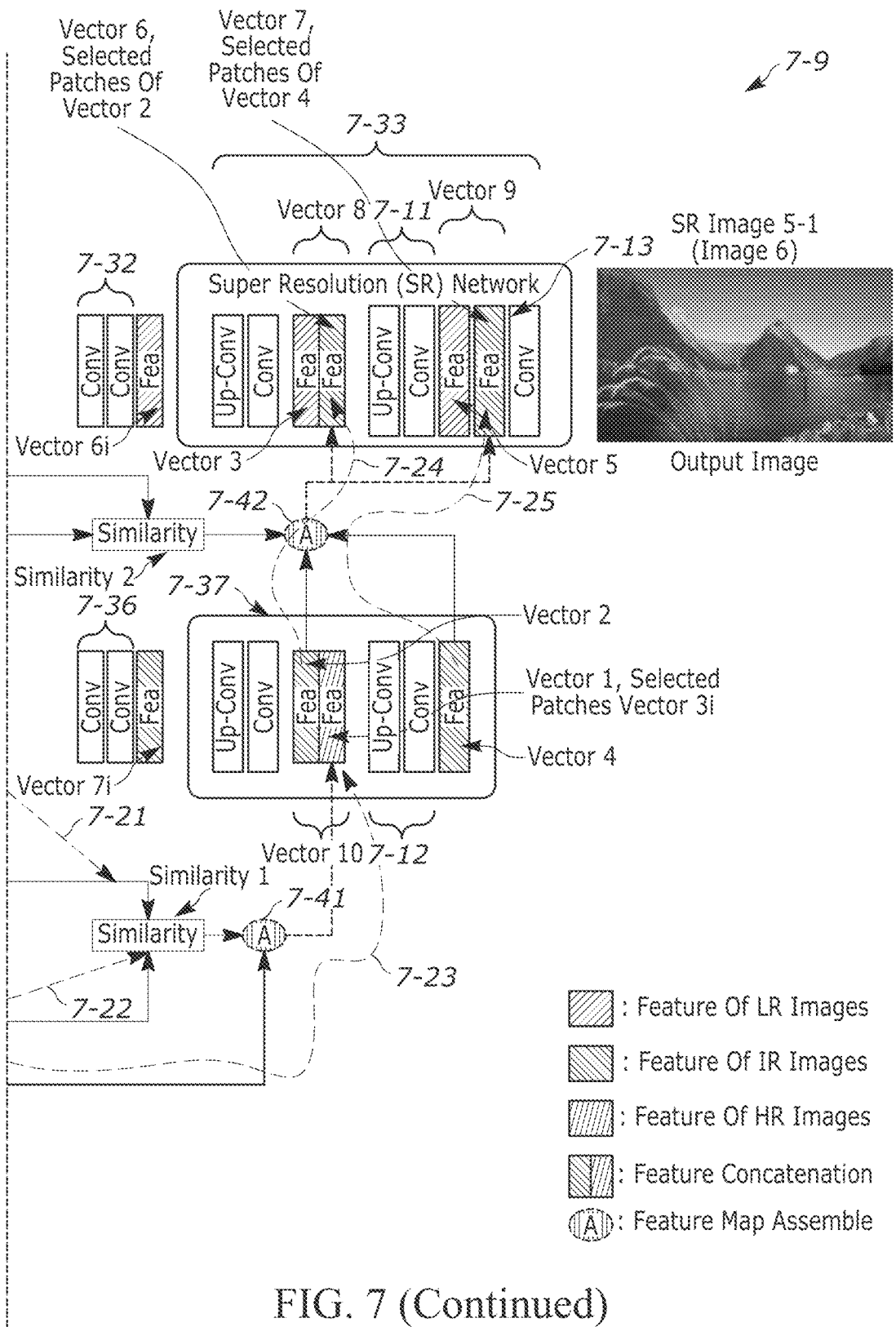

Referring briefly to FIG. 7, operations commencing with the LS image are a part of top flow 7-1 which includes processing from the LS image through to the SR image 5-1. Operations commencing with the IR image and the BIR image are a part of middle flow 7-2. Operations commencing with the HR image and BHR image are part of bottom flow 7-3. Each flow begins with the same feature extractor. Further description is provided below.

Returning to FIG. 2, from the LS image, low resolution feature vectors 2-1 are obtained. From the IR image and the BIR image, medium resolution feature vectors 2-2 are obtained. From the HR image and the BHR image, high resolution feature vectors 2-3 are obtained. All of these feature vectors are directly comparable in terms of scale, based on the upsampling applied to create the LS image and the upsampling used to create the IR image. That is, the scale of the feature vectors is at the granularity of the HR image.

The feature vectors 2-1, 2-2 and 2-3 are combined at operation 2-30 to obtain hybrid feature vectors 2-4. At operation 2-50 the low resolution feature vectors 2-1 and the hybrid feature vectors 2-4 are combined to generate the SR image 2-5.

Figure 3A:
FIG. 3A, FIG. 3B, FIG. 3C, FIG. 3D and FIG. 3E illustrate examples of images used in producing a super resolution image, according to some embodiments.

FIG. 3A provides an example of an LS image. This image has been upscaled 4x from an original camera image captured through lens 1-2.

Figure 3C:
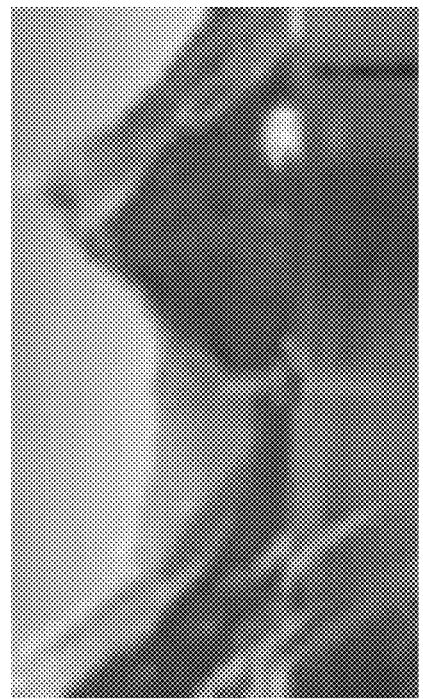
Figure 3B:
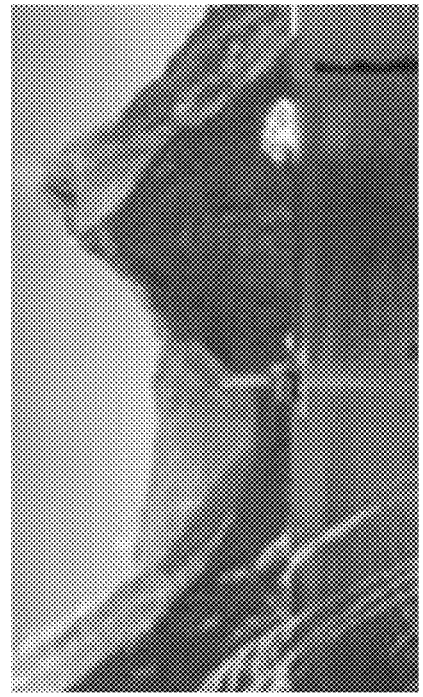

FIG. 3B provides an example of an IR image. This image has been upscaled 2x from an original camera image captured through lens 1-3.

FIG. 3C provides an example of a BIR image. This image is obtained by applying a naïve downsampling and then naïve upsampling to the IR image of FIG. 3B.

Figure 3D:

FIG. 3D provides an example of an HR image. This image is an original camera image captured through lens 1-4.

Figure 3E:

FIG. 3E provides an example of a BIR image. This image is obtained by applying a naïve downsampling and then naïve upsampling to the HR image of FIG. 3D.

Figure 4:
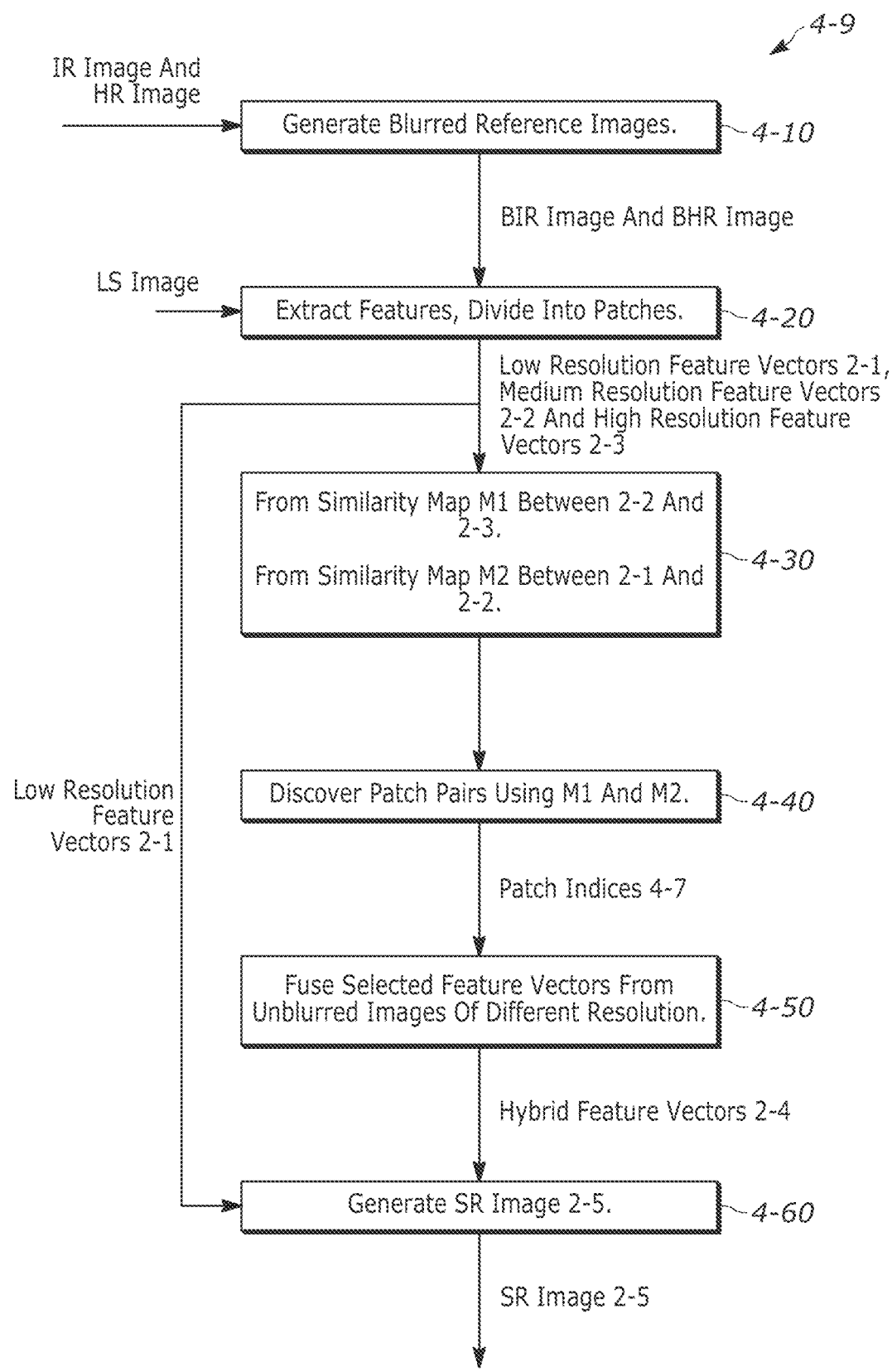
FIG. 4 illustrates a logic flow for producing a super resolution image using similarity maps, according to some embodiments.

FIG. 4 illustrates logic 4-9 with further details of patches and similarity maps. Operations 4-10 and 4-20 are similar to operations 2-10 and 2-20 of FIG. 2.

Operation 4-30 forms similarity map M1 between medium resolution feature vectors 2-2 and high resolution feature vectors 2-3. Similarity map M2 is formed between low resolution feature vectors 2-1 and medium resolution feature vectors 2-2.

Operation 4-40 produces patches indices 4-7 by discovering patch pairs using M1 and M2. Operation 4-50 fuses selected feature vectors from unblurred images of different resolution. The operation of fusing refers to concatenating vectors together and applying the result as an input to a convolutional neural network. Concatenation of the vector $U=[u_1, \ldots, u_N]$ with the vector $V=[v_1, \ldots, v_N]$ produces the vector $W=[u_1, \ldots, u_N, v_1, \ldots v_N]$ where U and V are of length N. In general U and V may be of different lengths. Concatenation may be indicated by a double plus symbol.

Figure 5A:
FIG. 5A and FIG. 5B illustrate an LS image and an SR image, according to some embodiments.
Figure 5B:

An example for comparing an LS image with an SR image is provided by FIGS. 5A and 5B. FIG. 5A is an example LS image. FIG. 5B is an SR image 5-1 which is an example of SR image 2-5 produced by logic 2-9 or by logic 4-9.

The quality of SR image 5-1, in terms of PSNR and structural similarity measure SSIM, is better than comparative approaches for upsampling and/or super resolution.

Figure 6:
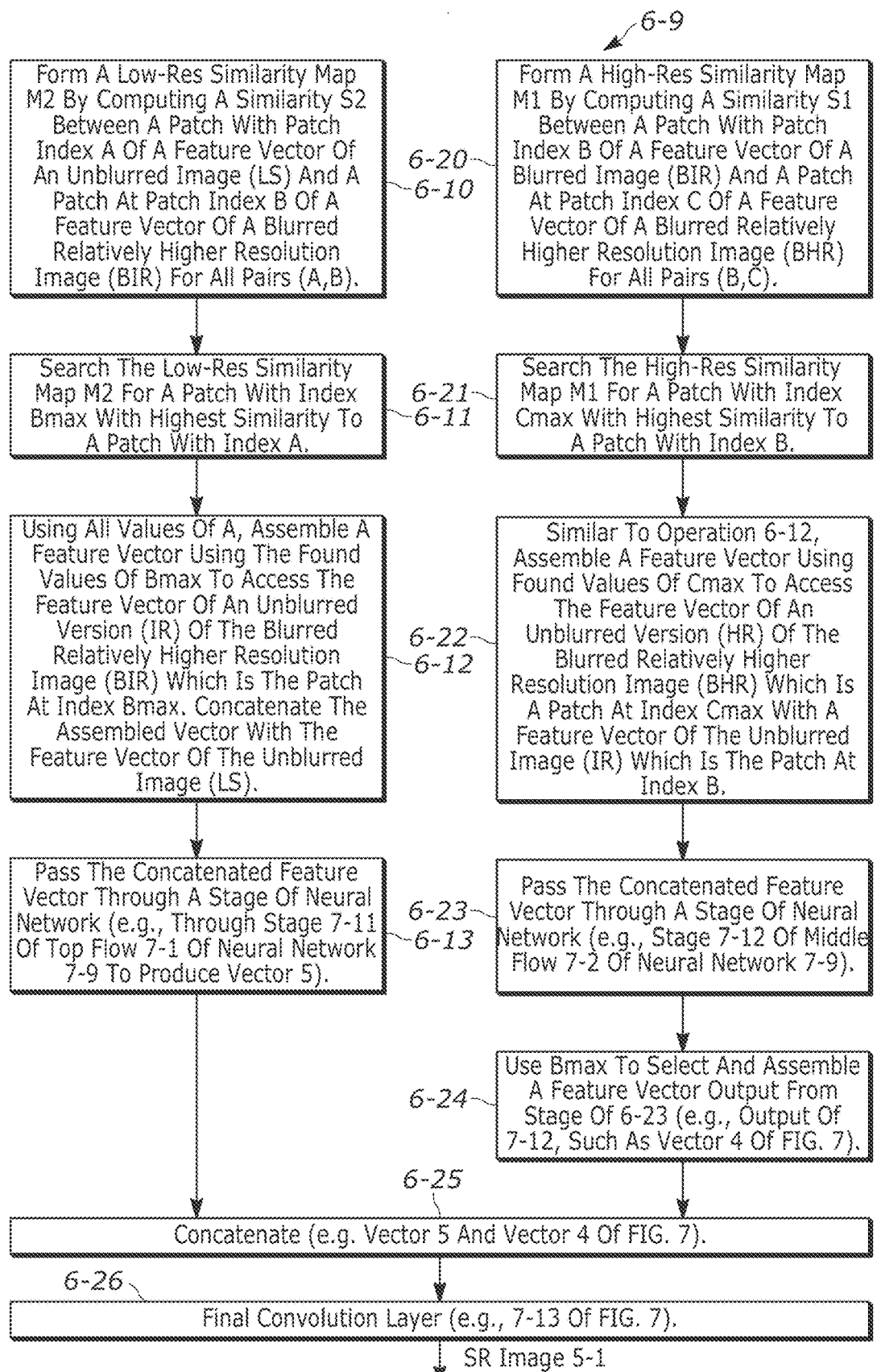
FIG. 6 illustrates exemplary logic for identifying patches using similarity maps and producing a super resolution image, according to some embodiments.

Further details specific to the embodiment for producing the SR image 5-1 are given in logic 6-9 of FIG. 6 and the neural network 7-9 of FIG. 7.

FIG. 6 provides logic 6-9 which uses the similarity maps M1 and M2 to identify texture from references images (IR image and HR image) and produce the high PSNR of image 5-1, as an example.

In FIG. 6, at operation 6-10, logic 6-9 forms the low-res similarity map M2 by computing a similarity S2 between a patch with patch index A of a feature vector of an unblurred image (LS) and a patch at patch index B of a feature vector of a blurred relatively higher resolution image (BIR) for all pairs (A,B).

At operation 6-11, logic 6-9 searches the low-res similarity map M2 for a patch with index Bmax with highest similarity to a patch with index A. A is an index which counts through all the patches of a feature vector, e.g., A=1, 2, . . . N where there are N patches in one feature vector. At operation 6-12, logic 6-9, using all values of A, assembles a feature vector using the found values of Bmax to access the feature vector of an unblurred version (IR) of the blurred relatively higher resolution image (BIR) which is the patch at index Bmax. Concatenate the assembled vector with the feature vector of the unblurred image (LS). As an example of this concatenation from FIG. 7, operation 6-12 outputs the concatenation of vector 3 from LS with vector 6. Vector 6 is composed of selected patches of vector 2 arising from the IR image.

At operation 6-13, fusing is performed by passing the concatenated feature vector through a stage of neural network (e.g., through stage 7-11 of top flow 7-1 of neural network 7-9 to produce vector 5). Operation 6-25, which has two inputs, is then reached. The second input to operation 6-25 is derived beginning with operation 6-20.

At operation 6-20, logic 6-9 forms a high-res similarity map M1 by computing a similarity S1 between a patch with patch index B of a feature vector of a blurred image (BIR) and a patch at patch index C of a feature vector of a blurred relatively higher resolution image (BHR) for all pairs (B,C). Logic 6-9, at operation 6-21, then searches the high-res similarity map M1 for a patch with index Cmax with highest similarity to a patch with index B. Operation 6-22, similar to operation 6-12, assembles a feature vector using found values of Cmax to access the feature vector of an unblurred version (HR) of the blurred relatively higher resolution image (BHR) which is a patch at index Cmax with a feature vector of the unblurred image (IR) which is the patch at index B. An example of the output of operation 6-22 is the concatenation of vector 2 associated with the IR image with vector 1 which is made up of selected patches of vector 3i from the HR image. At operation 6-23, logic 6-9 passes the concatenated feature vector through a stage of the neural network (e.g., stage 7-12 of middle flow 7-2 of neural network 7-9).

At operation 6-24, logic 6-9 uses Bmax to select and assemble a feature vector output from stage of 6-23 (e.g., output of 7-12, such as vector 4 of FIG. 7). Bmax was determined at operation 6-12 for each value of the index A.

At operation 6-25, the vectors arising from operation 6-13 and 6-24 are concatenated. An example from FIG. 7 is concatenation of vector 5 and vector 4.

At operation 6-26 the concatenated vector from operation 6-25 is passed through a convolution layer to provide the SR image 5-1. An example of the convolution layer is 7-13 of FIG. 7.

In FIG. 7, operations commencing with the LS image are a part of top flow 7-1 which includes processing from the LS image through to the SR image 5-1. Operations commencing with the IR image and the BIR image are a part of middle flow 7-2. Middle flow 7-2 includes processing of the IR image and the BIR image through to the outputs of super resolution network 7-31. Operations commencing with the HR image and BHR image are part of bottom flow 7-3. Bottom flow 7-3 includes processing the HR image and the BHR image up to routing vector 3i up to vector 1 based on similarity 1.

Top flow 7-1 of FIG. 7 passes the LS image through feature extractor 7-31. Feature extractor 7-31, in some embodiments has three convolution layers with channel size {16, 16, 32} and a kernel size of (3×3) for each layer and stride {1, 2, 1}. The output of the feature extractor 7-31 is the vector 4i. The vector 4i is fed through two convolution layers identified as 7-32 and produces a vector 6i which is input to the top flow super resolution network 7-33 to produce vector 3. Vector 3 is concatenated with vector 6 of top flow 7-1 (made up of selected patches of vector 2). Specifically, the top flow super resolution network 7-33 receives indices from similarity map M2 to select patches of vector 2 (forming vector 6) and patches of vector 4 (forming vector 7) to improve the SR image 5-1.

Vector 3 and the vector 6 are concatenated as vector 8. Vector 8 passes through up conversion and a convolution layer (together indicated as 7-11 in FIG. 7) to produce vector 5.

Vector 5 and vector 7 are concatenated as vector 9. Vector 9 passes through the convolution layer 7-13 and the result is the SR image 5-1.

Considering the architecture of neural network 7-9, five images are brought in on the left. The images pass through one or another of feature extractors 7-31, 7-34 and 7-35. Intermediate vectors vector 1i, vector 2i, vector 3i, vector 4i, vector 5i, vector 6i, vector 7i, vector 1, vector 2, vector 3, vector 4, vector 5, vector 6 and vector 7 are produced, among other vectors. Neural network 7-9 includes two similarity functions: similarity 2 operating between the top flow 7-1 and the middle flow 7-2, and similarity 1 operating between the middle flow 7-2 and the bottom flow 7-3. Each similarity function controls a feature map assemble function which acts as a selector or multiplexer to bring in selected patches to form an assembled feature vector in a different flow.

Details of the middle flow 7-2 will now be described. The IR image, which is a two times upsampled version of the IR image captured by mobile device 1-1, is blurred to produce the BIR image. Both pass through feature extractor 7-34, which is the same as feature extractor 7-31. The resulting feature vectors are divided into patches. An example patch is shown as patch 2 in FIG. 7 (in the middle flow 7-2, in vector 2i).

The goal of similarity 2 is to find a patch from vector 5i, for example patch 5 of FIG. 7, which will finally improve SR image 5-1 by being a best match to patch 4 of vector 4 which corresponds to the LS image. To do this, patch 4 which originated with the LS image is compared with all the patches in vector 2i which originated with the BIR image. This comparison is indicated by the block similarity 2 of FIG. 7 and the selected patch at two resolutions is passed to the top flow 7-1 by the function feature map assemble 7-42.

That is, the resulting best match from the BIR image is used to indicate the same patch, but in the IR image (patch 5 of vector 5i). After processing by two convolution layers to produce vector 7i, up-convolution and the convolution of the middle flow super-resolution network 7-37, vector 2 is obtained. The result of similarity 2 chooses an instance of vector 2, and this is concatenated with vector 3 in the top flow 7-1 as described above.

The bottom flow 7-3 provides an instance of vector 3i as vector 1, and vector 1 is concatenated with vector 2 as vector 10. Vector 10 passes through the up-convolution and convolution layer indicated as 7-12 in FIG. 7 to produce vector 4. The top flow 7-1 uses the instance of vector 4 indicated by similarity 2 to produce vector 7. The same index from M2 is used to select from vector 2 to build vector 6 and from vector 4 to build vector 7.

The bottom flow 7-3 passes the BHR image and the HR image through the feature extractor 7-35, which is the same as feature extractors 7-31 and 7-34. The BHR image produces vector 1i and the HR image produces vector 3i. The similarity map M1 is used to find a patch similar to patch 2 of the BIR image. The best matching patch for a given patch 2 is, for example, patch 1 of vector 1i. The patch with the same index from vector 3i is then selected by similarity 1 and feature map assemble function 7-41 to occupy the position of vector 1 in the middle flow 7-2.

Figure 8:
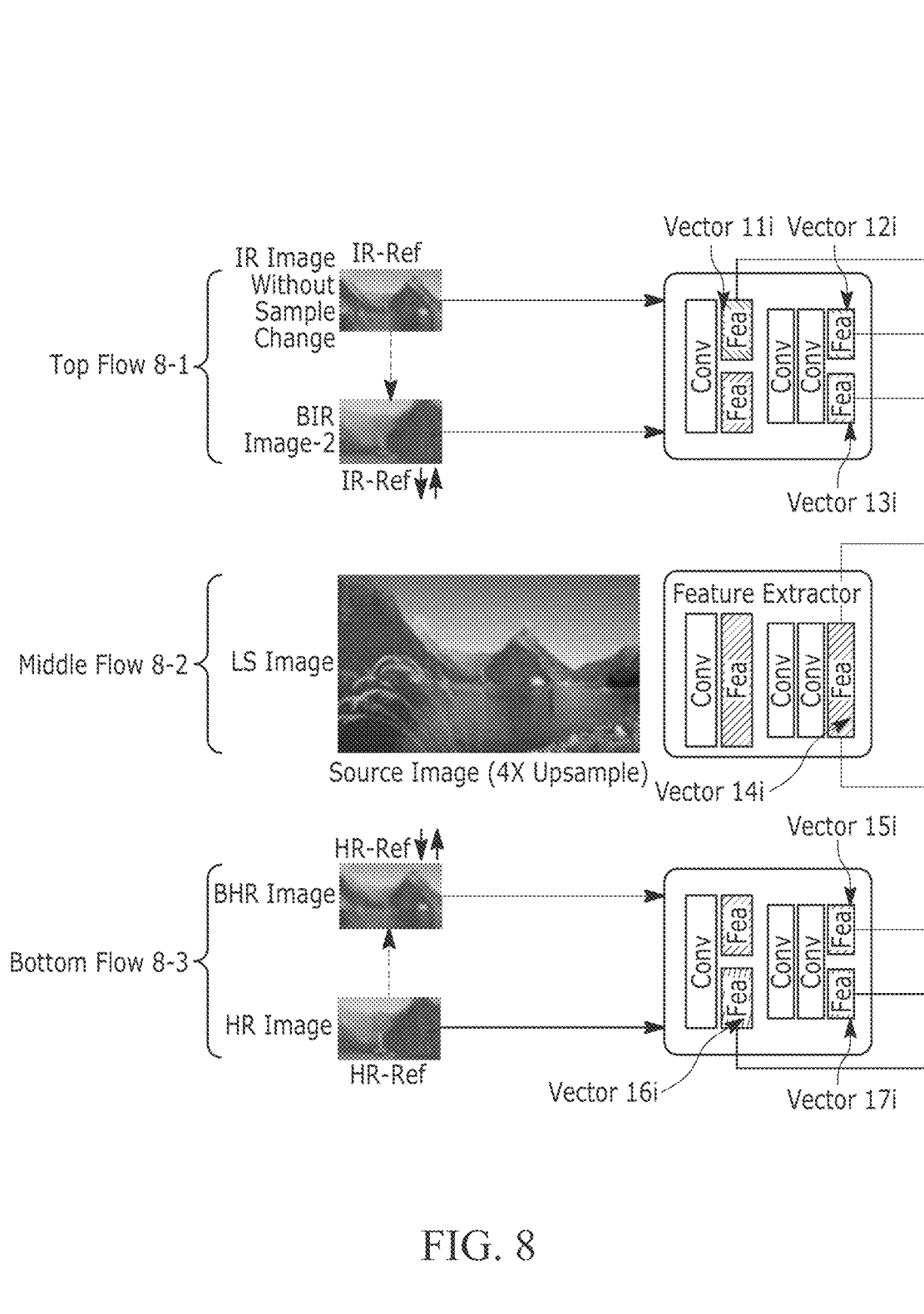
FIG. 8 illustrates an alternative neural network for producing a super resolution image, according to some embodiments.
Figure 8:
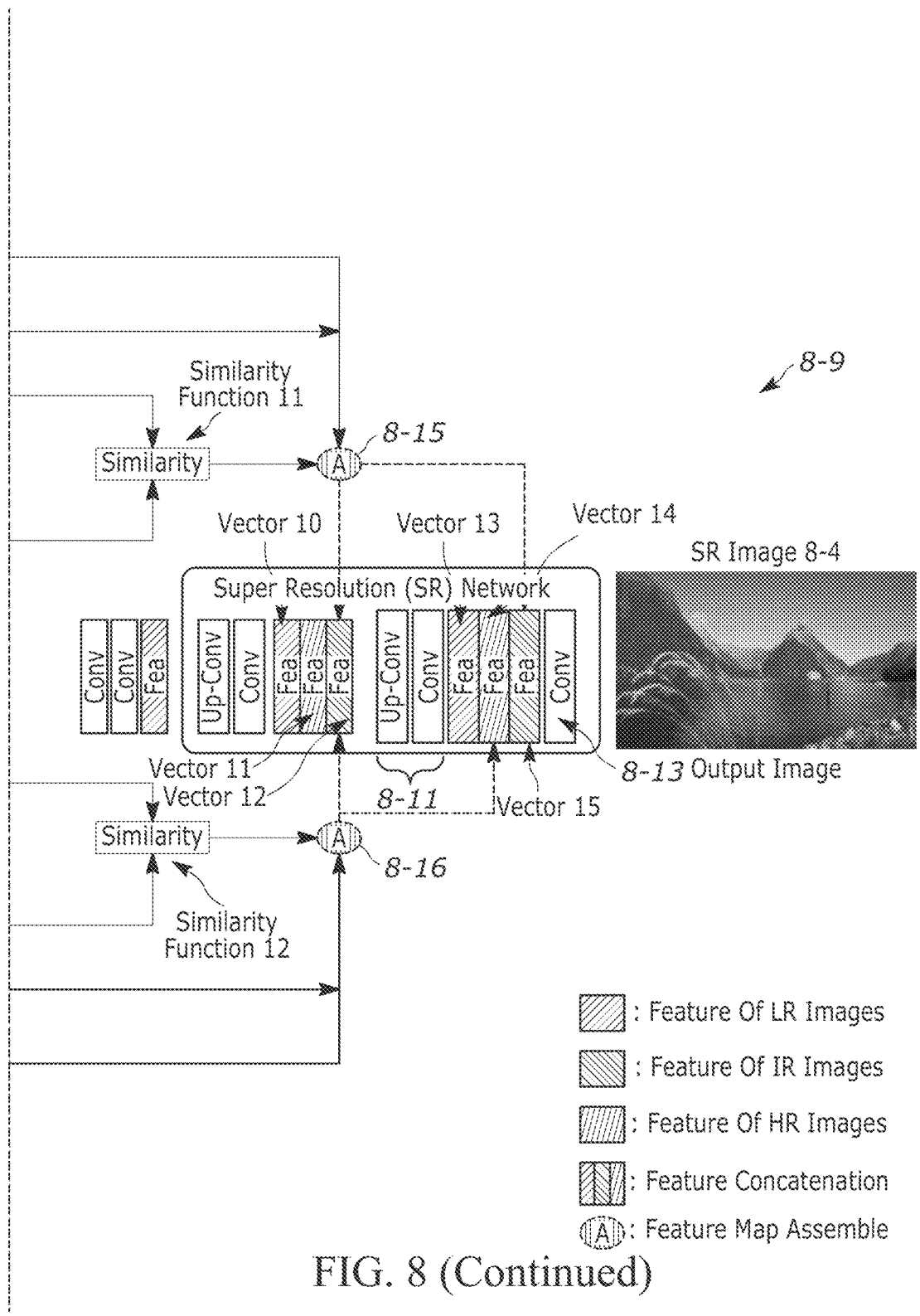

FIG. 8 illustrates a neural network 8-9 of an alternative embodiment. The neural network 8-9 is similar to the neural network 7-9 and somewhat simpler. The neural network 7-9 includes top flow 8-1, middle flow 8-2 and bottom flow 8-3. The description of FIG. 8 emphasizes differences from FIG. 7, other structural components and actions are similar to those in FIG. 7.

The input to the top flow 8-1 is the IR image without sample change (see FIG. 1) and a blurred image of the IR image without sample change, called BIR image-2 to for clarity with respect to the BIR image of FIG. 7. The input to the middle flow 8-2 is the LS image. The input to the bottom flow 8-3 is the pair of images BEM image and HR image. Similarity function 11 and similarity function 12 are similar to similarity function 1 and similarity function 2 of FIG. 7. Likewise the feature map assemble functions of FIG. 8 are similar to those of FIG. 7.

The feature extractors of FIG. 8 are the same as those of FIG. 7. The feature extractors produce vector 11i, vector 12i, vector 13i, vector 14i, vector 15i, vector 16i and vector 17i. Patches are selected from vector 11i and vector 12i by similarity function 11 and assembled by feature map assemble function 8-15 to produce vector 12 and vector 15. Also, patches are selected from vector 16i and vector 17i by similarity function 12 and assembled by feature map assemble function 8-16 to produce vector 11 and vector 14.

The middle flow 8-2 produces vector 10 which is then concatenated with vector 11 and vector 12 and passed through the up-convolutional layer and convolutional layer indicated as 8-11 to produce vector 13. Vectors 13, 14 and 15 are then concatenated and pass through the convolutional layer 8-13 to provide the SR image 8-4.

In summary, an embodiment of producing a super resolution image is shown in FIG. 8. The method includes extracting a first plurality of feature vectors from an original medium resolution image, wherein the first plurality of feature vectors includes a first intermediate feature vector and a second intermediate feature vector (for example, vector 11i and vector 12i from the IR image without sample change). The method also includes extracting a third intermediate feature vector from a blurry version of the original medium resolution image (for example vector 13i from the BIR image 2). The method also includes extracting a fourth intermediate feature vector from a blurry version of an original low resolution image (for example, vector 14i from the LS image). The method also includes extracting a fifth intermediate feature vector from a blurry version of an original high resolution image (for example, vector 15*i* from the BEM image). The method also includes extracting a second plurality of feature vectors from the original high resolution image, wherein the second plurality of feature vectors includes a sixth intermediate feature vector and a seventh intermediate feature vector (for example vector 16*i* and vector 17*i* from the HR image).

The method also includes choosing patches of a first feature vector and a fourth feature vector from the second plurality of feature vectors based on a similarity of patches with respect to the fourth intermediate feature vector (vector 14*i*) to the fifth intermediate feature vector (vector 15*i*); choosing patches of a second feature vector and a fifth feature vector from the first plurality of feature vectors based on a similarity of patches with respect to the third intermediate feature vector (vector 13*i*) to the fourth intermediate feature vector (vector 14*i*).

The method also includes fusing the first feature vector and the second feature vector to form a third feature vector; and fusing the third feature vector, the fourth feature vector and the fifth feature vector to form the super resolution image.

Figure 9:
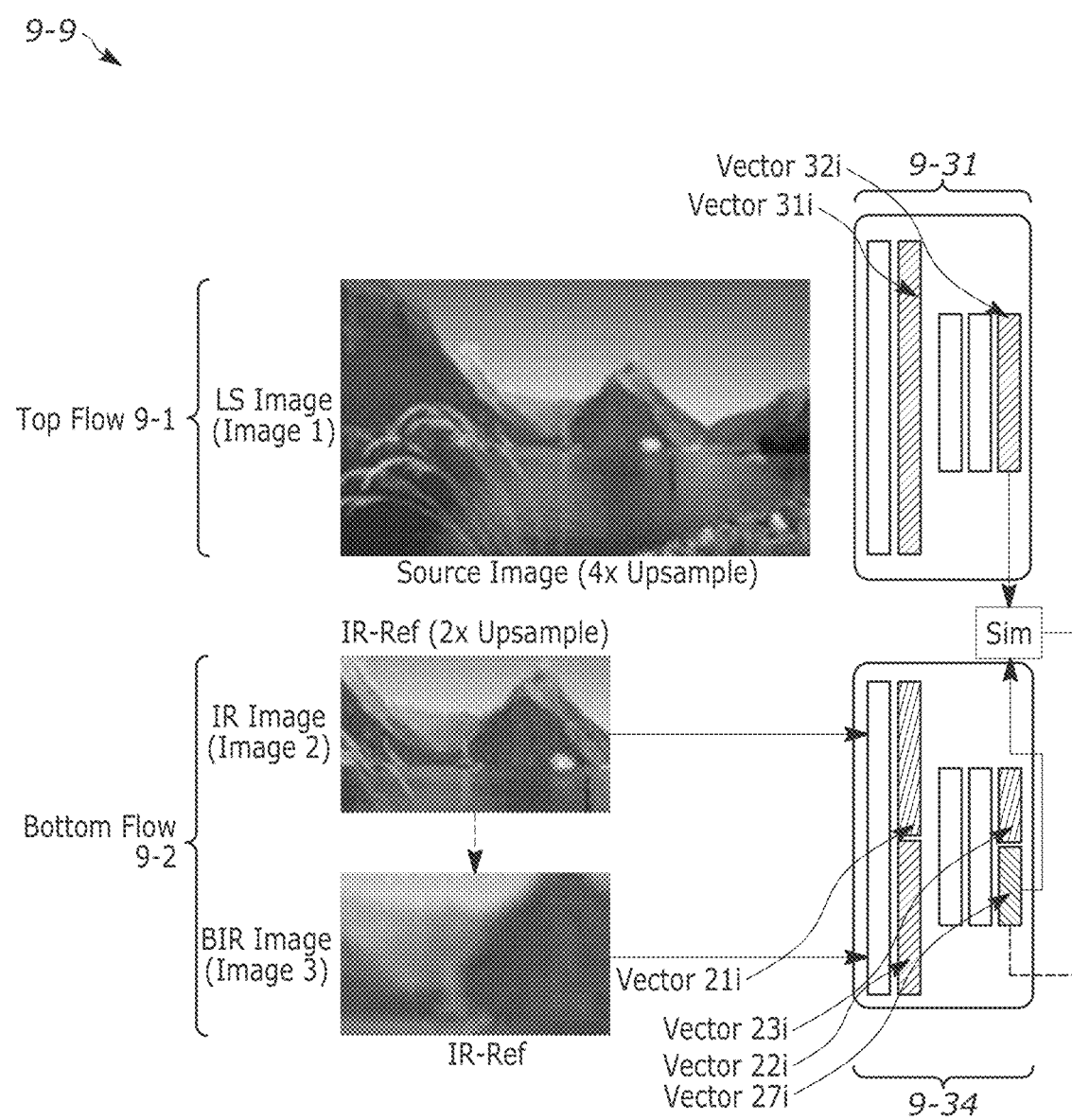
FIG. 9 illustrates methods of improving image texture when only one reference image is available, according to some embodiments.
Figure 9:
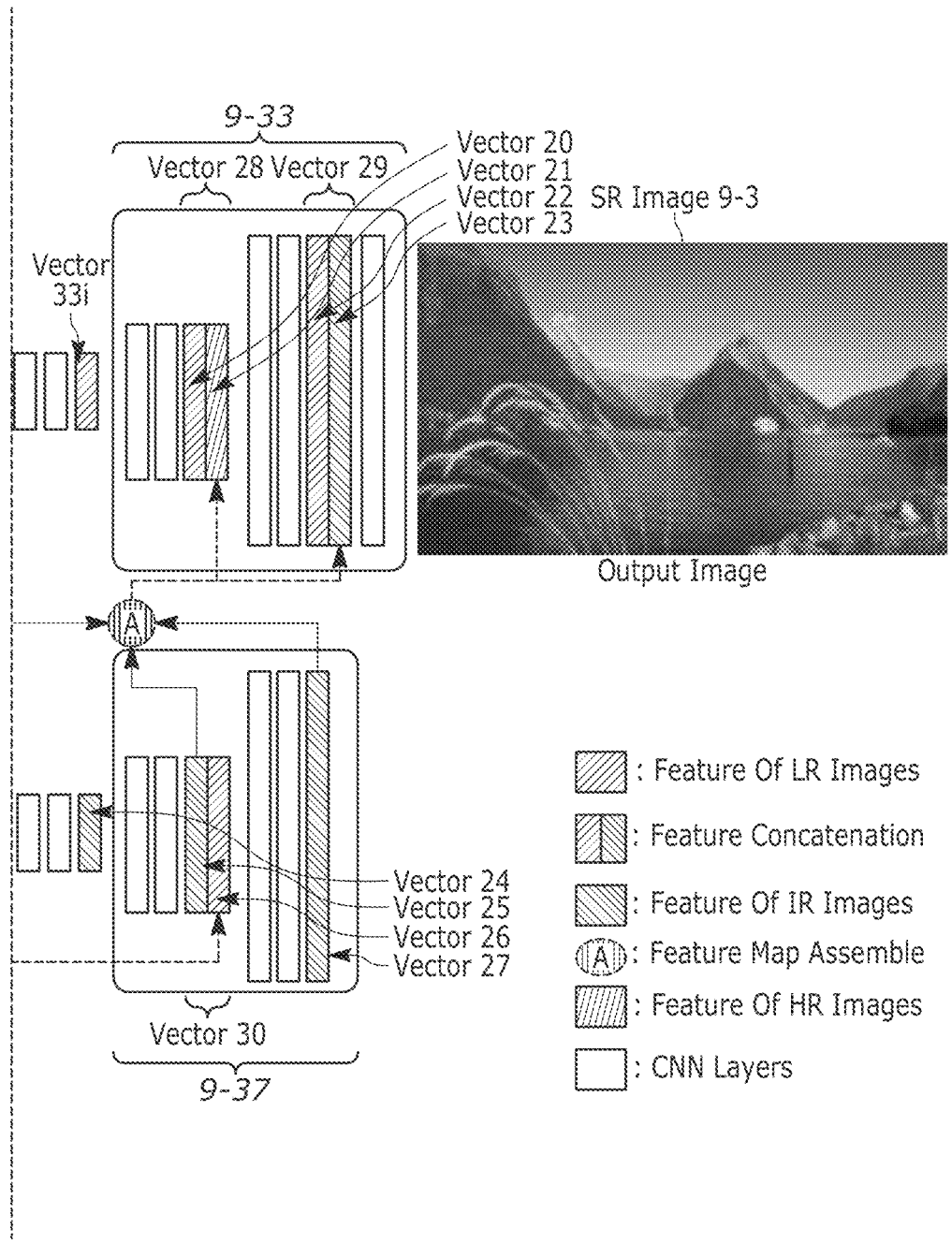

In some embodiments, the models can be used for with only one reference image, corresponding to a scenario in which the mobile device 1-1 only has two cameras, instead of three cameras. In general, if there is a lack of a reference image (and as a result, a lack of an assembled enhanced feature map), features from the feature extractor are extracted and concatenated to the SR network as the replacement for the missing assembled enhanced feature map. FIG. 9 is for use with one reference image.

FIG. 9 includes top flow 9-1 and bottom flow 9-2. The LS image is input to the top flow 9-1. The IR image and the BIR image are input to the bottom flow 9-2.

In the top flow, the feature extractor 9-31 obtains a feature vector 31*i*, performs a down-convolution to reduce sample rate and then obtains a feature vector 32*i*. Vector 32*i* passes through two convolution layers to obtain the vector 33*i*, which is input to the super resolution network 9-33 after up-convolution to increase sample rate. Vector 33*i* passes through two convolution layers to produce vector 20. Vector 20 is concatenated with vector 21 to produce vector 28. Vector 28 passes through up-convolution and then two convolution layers to provide vector 22. Vector 22 is concatenated with vector 23 to produce vector 29. Vector 29 passes through a final convolution layer to provide the SR image 9-3.

In the bottom flow, the IR image and the BIR image pass into the feature extractor 9-34 to produce intermediate feature vectors 21*i* and 22*i*, respectively. As a brief aside, a convolution layer itself is able to down-adjust the sample rate (perform downsampling), based on the layer settings. In some embodiments, a down-convolution is included in the (first) one of the two convolution layers. The expression "two convolution layers" and "a down-convolution and a convolution layer" are equivalent when down-sampling occurs. Downsampling is also indicated in the figures by a vector representation of a tall narrow rectangle changing to a shorter narrow rectangle. Similarly, up-sampling is implied to have occurred when a shorter narrow rectangle becomes a taller narrow rectangle.

Referring again to intermediate feature vectors 21*i* and 22*i*, these vectors each pass through two convolution layers and produce vectors 23*i* and 27*i*, respectively. A similarity calculation ("Sim" in FIG. 9) is applied to each patch in vector 32*i* in comparison with the patches of 27*i*. The resulting index is used to build vector 21 from selected patches of vector 25 and build vector 23 from selected patches of vector 27. The assembly of selected patches is performed by the feature map assemble function (marked with "A" in FIG. 9).

Returning to the bottom flow 9-2, vector 23*i* goes through two convolution layers to produce the vector 24. Vector 24 goes through an up-convolution and this produces vector 25. There is no second reference image to provide patches to build up vector 26. Vector 26 is instead obtained as vector 27*i*. In the one-reference model, embodiments use vector 27*i* as vector 26. Their values are exactly the same. In this case, although vector 27*i* looks smaller than vector 26, but actually they have the same size. Vectors 25 and 26 are then concatenated to form vector 30. Vector 30 passes through an up-convolution and then two convolution layers to obtain vector 27. Vector 27 is used as described above to provide patches to build up vector 23.

Figure 10A:
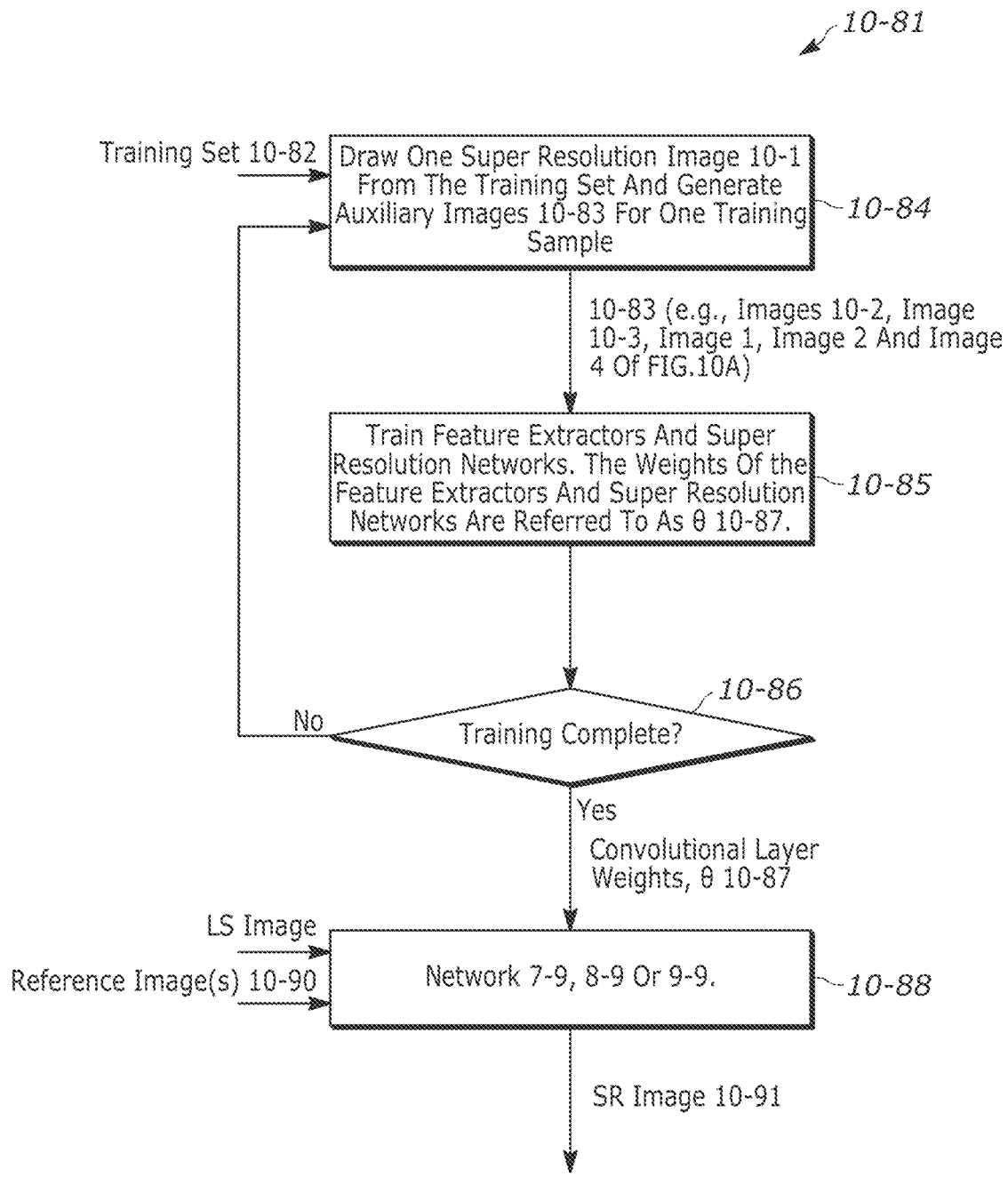
FIG. 10A illustrates logic for training, according to some embodiments.
Figure 10B:
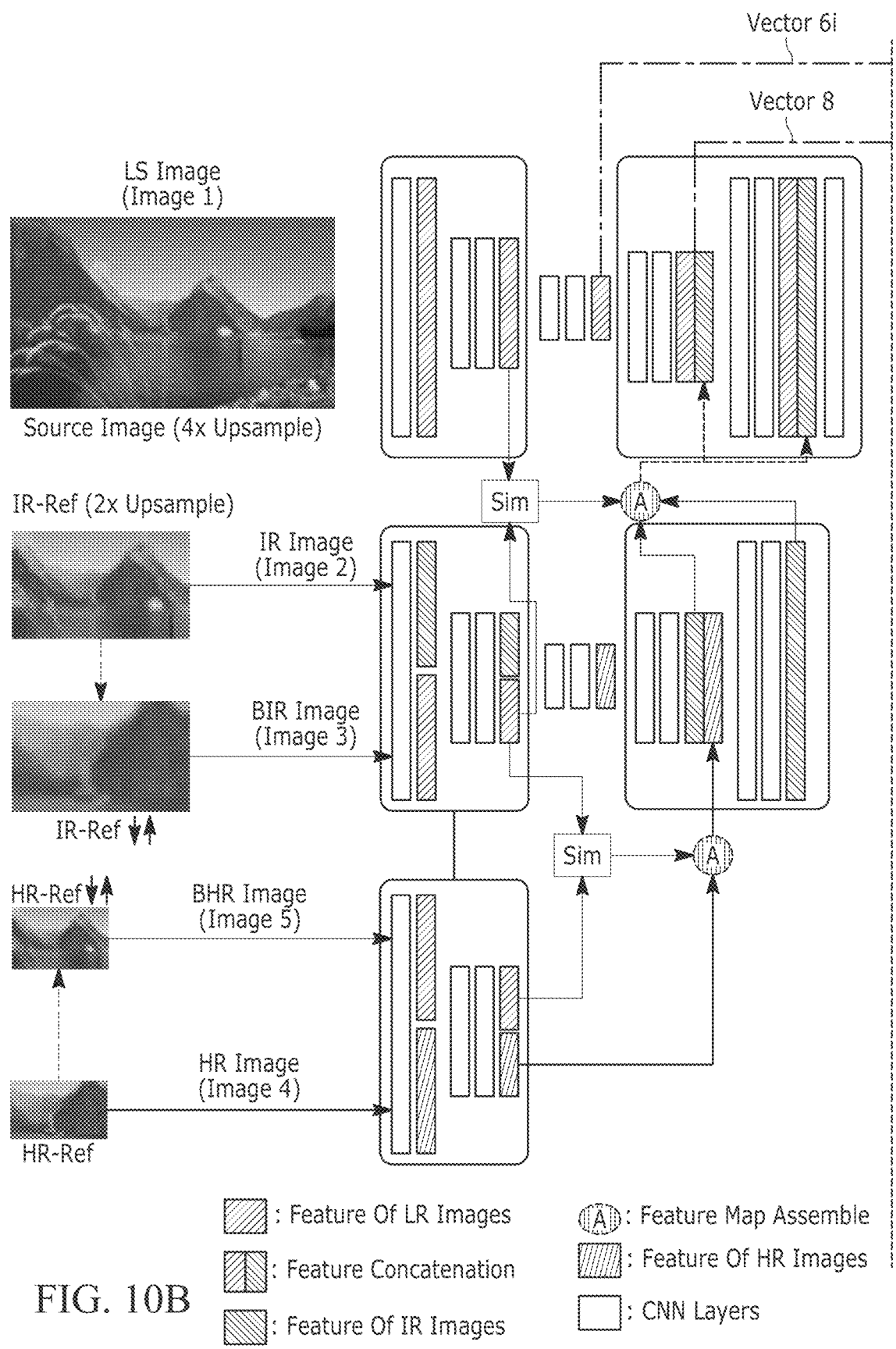
FIG. 10B illustrates an architecture for training, according to some embodiments.
Figure 10B:
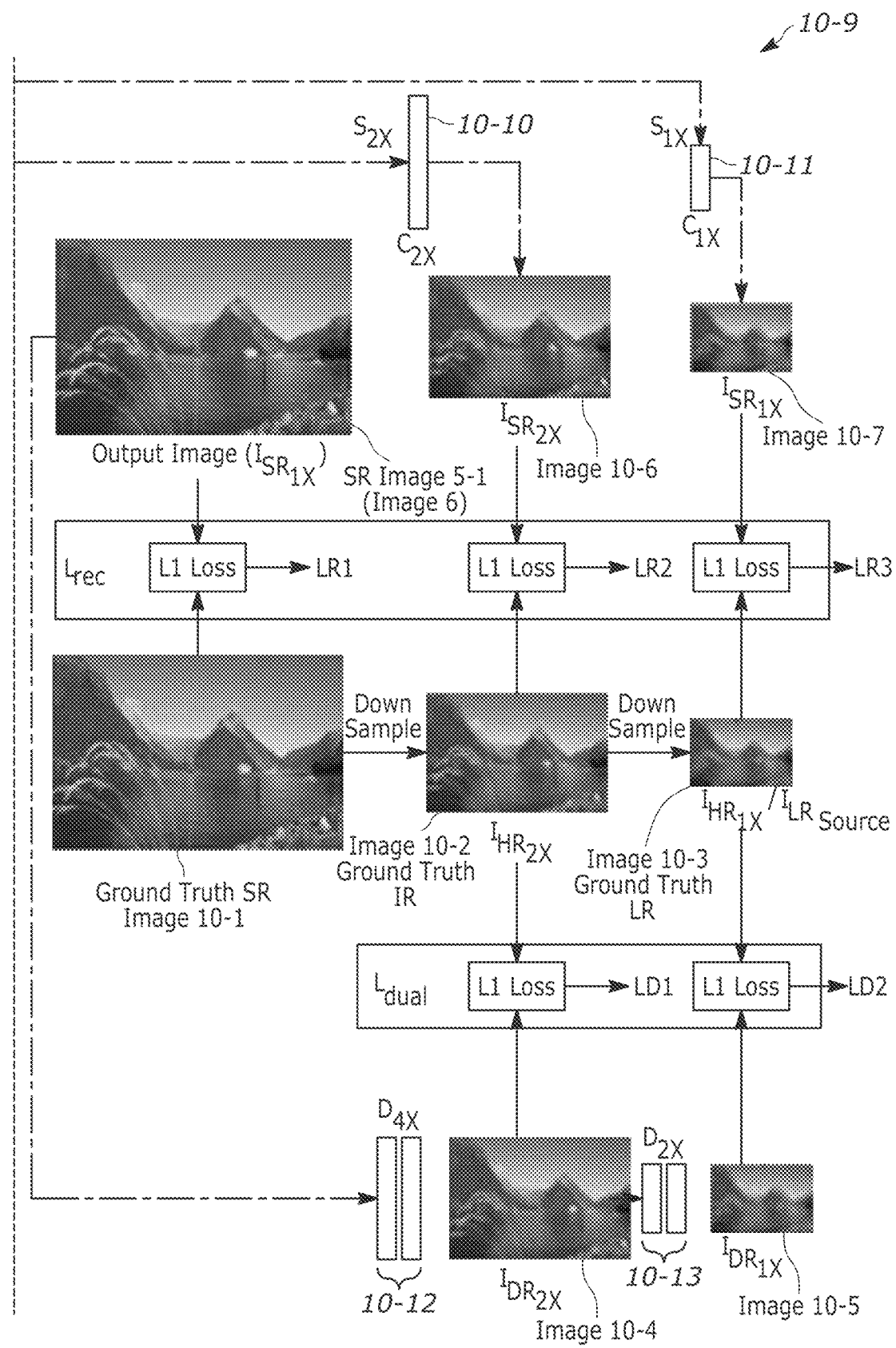

FIG. 10A illustrates logic 10-81 for training. At operation 10-84, a high resolution image 10-1 with the same focal length as a low resolution image (that is, capturing the same width and height of a scene) is taken from a training set 10-82. Auxiliary images 10-83 are synthesized from the high resolution training image. Images 10-1 and 10-2 of FIG. 10B are examples of auxiliary images 10-83. Simulated images from the camera 1-1 for testing, image 1, image 2 and image 4, are also synthesized from image 10-1. At operation 10-85, the logic 10-81 trains feature extractors and super resolution networks. The weights of the feature extractors and super resolution networks are referred to as θ 10-87. An example structure used for training is illustrated in FIG. 10B.

At operation 10-86, a determination is made whether training of the weights is complete. This determination may be based on a mean square error between a reconstructed super resolution image (such as image 5-1 of FIG. 5B and FIG. 10B) and the ground truth super resolution image 10-1. If the training is not complete, the logic returns to operation 10-84 for another and different image 10-1. If the training is complete, the logic flows to operation 10-88, providing the weights θ 10-87.

Operation 10-88 has inputs of the LS image and one or more reference images 10-90. Operation 10-88 implements the processing of network 7-9 (FIG. 7), network 8-9 (FIG. 8) or network 9-9 (FIG. 9). The output of the operation 10-88 is an SR image 10-91. An example of the SR image 10-91 is image 5-1 as shown in FIG. 5B from network 7-9 of FIG. 7.

FIG. 10B illustrates a network 10-9 training. The network 10-9 is an example implementation for the operation 10-85 of FIG. 10A for network 7-9 of FIG. 7. The neural networks 8-9 and 9-9 may be trained in a similar manner.

The layers of the model (weights θ 10-87) are trained in part using reconstruction loss LR1, LR2 and LR3. The training is also based on dual loss LD1 and LD2.

Several images are used for training, as described below. Three scales are shown in the bottom right of FIG. 10B. Image 5-1 and image 10-1 correspond to HR scale, that is, the resolution of the HR image (image 4). Images 10-6, 10-2 and 10-4 correspond to IR scale, that is, the resolution of the IR image (image 2). Images 10-7, 10-3 and 10-5 correspond to LS scale, that is the resolution of the LS image (image 1).

In terms of data and functional blocks, FIG. 10B includes the neural network 7-9 which is being trained, the super resolution ground truth image 10-1, the estimated super resolution image 5-1, and a function for comparing these using the 1-norm of the difference. Specifically, the 1-norm of the difference between image 5-1 and image 10-1 gives the reconstruction loss LR1.

LR2 is produced based on an image 10-6 provided by the network under training after passing vector 8 through a convolutional layer 10-10. The function of the layer 10-10 is to turn vector 8 into an image. A 1-norm difference is taken between image 10-6 and image 10-2 to provide LR2. Image 10-2 is a downsampled version of image 10-1. Image 10-2 is a ground truth image at the resolution of the IR image. LR3 is produced from image 10-7 compared with image 10-3. Image 10-7 is obtained by passing vector 6i through a convolutional layer 10-11. Image 10-3 is a ground truth image at the resolution of the LS image.

Besides the reconstruction losses LR1, LR2 and LR3, dual regression losses LD1 and LD2 are included for training, in some embodiments. A dual regression training scheme contains a primal regression task for super-resolution and a dual regression task to project super-resolved images back to LR images. The primal and dual regression tasks form a closed-loop.

Dual regression convolution layers 10-12 downscale the image 5-1 to produce image 10-4. Dual regression convolution layers 10-13 downscale the image 10-4 to produce the image 10-5. LD1 is the norm-1 difference between image 10-2 and image 10-4. LD2 is the norm-1 difference between image 10-3 and image 10-5.

As an example, the reconstruction loss may be expressed as in Eq. 3.

$$LR1 = \left(\frac{1}{N_{SR}}\right)\|I_{5-1} - I_{10-1}\|_1 \qquad \text{Eq. 3}$$

$$LR2 = \left(\frac{1}{N_{IR}}\right)\|I_{10-6} - I_{10-2}\|_1 \qquad \text{Eq. 4}$$

$$LR3 = \left(\frac{1}{N_{LR}}\right)\|I_{10-7} - I_{10-3}\|_1 \qquad \text{Eq. 5}$$

Where the notation $I_M$ refers to the image with reference number M. For example, image 5-1 is indicated in Eq. 3 as 15-1.

The ground truth HR image 10-1 is naively downsampled by different scale factors to get the image 10-2 and the image 10-3.

A total reconstruction loss is $L_{rec}$=LR1+LR2+LR3.

The dual losses are similar to the expressions for the reconstruction losses.

$$LD1 = \left(\frac{1}{N_{IR}}\right)\|I_{10-4} - I_{10-2}\|_1 \qquad \text{Eq. 6}$$

$$LD2 = \left(\frac{1}{N_{LR}}\right)\|I_{10-5} - I_{10-3}\|_1 \qquad \text{Eq. 7}$$

A total dual loss is $L_{dual}$=LD1+LD2.

The entire model is trained with loss $L_{total}=\lambda_2 L_{rec}+\lambda_1 L_{dual}$.

The loss functions are combined to produce $L_{total}$ and this is used to update the weights θ 10-87 of the neural network being trained (network 7-9 for the example of FIG. 10B). An Adam optimizer may be used. Adam is an optimization algorithm for stochastic gradient descent for training deep learning models.

A decay rate of the Adam optimizer, may have a value of, for example, 0.9. A is a value set in using the Adam optimizer to combine the losses, and may be, for example 0.1. A learning rate may be initialized at a value of 0.0001 and then exponentially decayed after a number of epochs. The number of epochs may be, for example, 20.

In some embodiments, a VGG19 network and a discriminator network are included to construct the perceptual loss and adversarial loss to enhance the training power. VGG-19 is a convolutional neural network that is 19 layers deep. The VGG19 network operates on image 5-1 to produce an SR feature vector and operates on image 10-1 to produce a GT (ground truth) feature vector, and a difference of these features provides a perceptual loss, $L_{per}$. A discriminator network produces an estimate of whether the estimated super resolution image, image 5-1, is real or fake and an estimate of whether the ground truth image, image 10-1, is real or fake; and a difference of these provides the adversarial loss, $L_{adv}$.

In this embodiment, the total loss is then given in Eq. 8.

$$L_{total}=\lambda_4 L_{per}+\lambda_3 L_{adv}+\lambda_2 L_{rec}+\lambda_1 L_{dual} \qquad \text{Eq. 8}$$

The weights θ 10-87 are then trained using $L_{total}$ of Eq. 8 and the Adam optimizer, in some embodiments.

Figure 11:
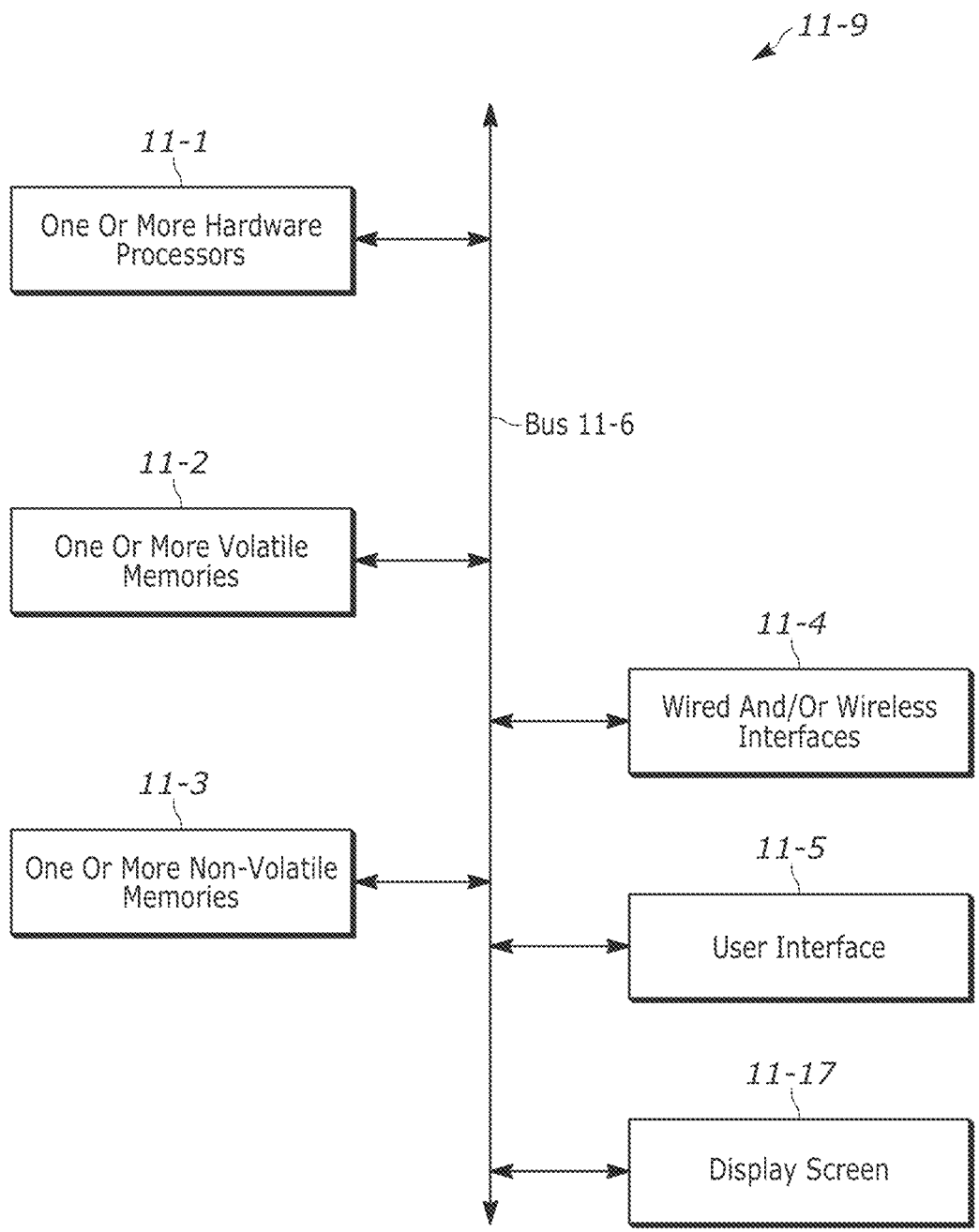
FIG. 11 illustrates exemplary hardware according to some embodiments.

FIG. 11 illustrates an exemplary apparatus 11-9 for implementation of the embodiments disclosed herein. For example, FIG. 11 illustrates exemplary hardware for implementation of computing devices such as the mobile device 1-1, according to some embodiments. The apparatus 11-9 may be a server, a computer, a laptop computer, a handheld device, or a tablet computer device, for example. Apparatus 11-9 may include one or more hardware processors 11-1. The one or more hardware processors 11-1 may include an ASIC (application specific integrated circuit), CPU (for example CISC or RISC device), and/or custom hardware. Apparatus 11-9 also may include wired and/or wireless interfaces 11-4. Apparatus 11-9 also may include a user interface 11-5 (for example a display screen and/or keyboard and/or pointing device such as a mouse). The apparatus 11-9 may also include, in addition, a display screen 11-17. Apparatus 11-9 may include one or more volatile memories 11-2 and one or more non-volatile memories 11-3. The components above may be connected by a bus 11-6. The one or more non-volatile memories 11-3 may include a non-transitory computer readable medium storing instructions for execution by the one or more hardware processors 11-1 to cause apparatus 11-9 to perform any of the methods of embodiments disclosed herein.

What is claimed is:

1. A method of forming a super resolution image, the method comprising:
    generating a plurality of auxiliary images from a plurality of original images, wherein the plurality of original images includes a low resolution image, a first medium resolution image and a high resolution image, and the high resolution image covers a portion of a content of the low resolution image but with higher resolution, and wherein the plurality of auxiliary images includes a second medium resolution image made blurry by a downsample operation and an upsample operation applied to the first medium resolution image;
    obtaining a plurality of feature vectors from the plurality of original images and from the plurality of auxiliary images;
    combining, based on a plurality of indices, a higher resolution feature vector with a lower resolution feature vector, and
    generating the super resolution image based on the combined feature vectors.

2. The method of claim 1, further comprising:
dividing the plurality of feature vectors into a first plurality of patches; and
obtaining patch pairs from the plurality of auxiliary images indicating a second plurality of patches of the plurality of original images with matching texture content,
wherein the second plurality of patches are associated with one or more higher resolution images of the plurality of original images, the plurality of indices includes a plurality of patch indices, the patch pairs are identified by the plurality of patch indices, and the higher resolution feature vector and the lower resolution feature vector are derived from the plurality of feature vectors at a patch dimension level.

3. The method of claim 2, wherein the combining uses a similarity to assemble an intermediate feature vector and a final feature vector, the plurality of feature vectors includes the intermediate feature vector and the final feature vector, and the combining further includes fusing a final intermediate feature vector with the final feature vector, wherein the final intermediate feature vector is obtained based on an intermediate fusion using the intermediate feature vector, and
wherein the similarity is based on an inner product, wherein respective vectors of the inner product are formed from respective patches of the first plurality of patches and the second plurality of patches being compared.

4. A method of forming a super resolution image, the method comprising:
generating a plurality of auxiliary images from a plurality of original images;
obtaining a plurality of feature vectors from the plurality of original images and from the plurality of auxiliary images;
combining, based on a plurality of indices, a higher resolution feature vector with a lower resolution feature vector, and
generating the super resolution image based on the combined feature vectors,
wherein the plurality of original images includes a low resolution image, an original medium resolution image and a high resolution image,
the plurality of auxiliary images includes a second blurry image and a first blurry image, and
the plurality of feature vectors includes a first feature vector and a second feature vector,
the method further comprising:
assembling the first feature vector of the high resolution image using features of the second blurry image and based on a first similarity, wherein a first plurality of feature vectors includes the first feature vector;
assembling the second feature vector of the original medium resolution image using features of the low resolution image and based on a second similarity, wherein a second plurality of feature vectors includes the second feature vector;
fusing the second feature vector with a third feature vector of the low resolution image to obtain a fifth feature vector;
fusing the fifth feature vector with a fourth feature vector to obtain the super resolution image, wherein the fourth feature vector is based on the first feature vector and the second feature vector; and
outputting the super resolution image to a display device.

5. The method of claim 4, wherein the assembling the first feature vector of the high resolution image includes:
downsampling and upsampling the high resolution image to obtain the first blurry image;
extracting a first intermediate feature vector from the first blurry image;
downsampling and upsampling of the original medium resolution image to obtain the second blurry image;
extracting a second intermediate feature vector from the second blurry image; and
assembling, based on the first similarity between the first intermediate feature vector and the second intermediate feature vector, a third intermediate feature vector associated with the high resolution image.

6. The method of claim 5, wherein the assembling the second feature vector of a medium resolution image using features of the low resolution image includes:
extracting a fourth intermediate feature vector from the low resolution image;
assembling, based on the second similarity between the fourth intermediate feature vector and the second intermediate feature vector, two feature vectors, wherein the two feature vectors are: i) the second feature vector associated with the original medium resolution image, and ii) a fifth intermediate feature vector associated with the original medium resolution image and the high resolution image.

7. The method of claim 5, further comprising:
calculating a first similarity map including a plurality of first inner product values, wherein the plurality of first inner product values are based on features extracted from the first blurry image and the second blurry image, wherein the plurality of first inner product values includes the first similarity.

8. The method of claim 7, further comprising:
calculating a second similarity map including a plurality of second inner product values, wherein the plurality of second inner product values are based on features extracted from the low resolution image and the second blurry image, wherein the plurality of second inner product values includes the second similarity.

9. The method of claim 4, wherein the low resolution image is a first upsampled version of a source image, wherein the source image is obtained using a wide-angle lens.

10. The method of claim 9, wherein the original medium resolution image is a second upsampled version of a regular resolution image, wherein the regular resolution image is obtained with a lens with typical focal length.

11. The method of claim 10, wherein the high resolution image is obtained with a telephoto lens.

12. The method of claim 4, further comprising training a feature extractor and a super resolution network using the low resolution image, the original medium resolution image and the high resolution image.

13. The method of claim 5, further comprising:
dividing the first blurry image into a first plurality of patches including a first patch, wherein the first intermediate feature vector corresponds to the first patch;
dividing the second blurry image into a second plurality of patches including a second patch, wherein the second intermediate feature vector corresponds to the second patch; and
dividing the high resolution image into a third plurality of patches including a third patch, wherein the first feature vector corresponds to the third patch, wherein the first similarity between the first intermediate feature vector and the second intermediate feature vector, is configured to indicate that the first patch is similar to the second patch, and the assembling the first feature vector of the high resolution image is based on the third patch corresponding with the second patch.

14. An apparatus for forming a super resolution image, the apparatus comprising:

one or more memories configured to store instructions; and one or more processors, wherein execution of the instructions by the one or more processors are configured to cause the apparatus to:

generate a plurality of auxiliary images from a plurality of original images, wherein the plurality of original images includes a low resolution image, a first medium resolution image and a high resolution image, and the high resolution image covers a portion of a content of the low resolution image but with higher resolution, and wherein the plurality of auxiliary images includes a second medium resolution image made blurry by a downsample operation and an upsample operation applied to the first medium resolution image;

obtain a plurality of feature vectors from the plurality of original images and from the plurality of auxiliary images;

combine, based on a plurality of indices, a higher resolution feature vector with a lower resolution feature vector, and generate the super resolution image based on the combined feature vectors.

15. The apparatus of claim 14, wherein the execution of the instructions by the one or more processors is further configured to cause the apparatus to:

divide the plurality of feature vectors into a first plurality of patches; and obtain patch pairs from the plurality of auxiliary images indicating a second plurality of patches of the plurality of original images with matching texture content, wherein the second plurality of patches are associated with one or more higher resolution images of the plurality of original images, the plurality of indices includes a plurality of patch indices, the patch pairs are identified by the plurality of patch indices, and the higher resolution feature vector and the lower resolution feature vector are derived from the plurality of feature vectors at a patch dimension level.

16. A non-transitory computer readable medium configured to store instructions, wherein execution of the instructions by one or more processors of a computer are configured to cause the computer to:

generate a plurality of auxiliary images from a plurality of original images, wherein the plurality of original images includes a low resolution image, a first medium resolution image and a high resolution image, and the high resolution image covers a portion of a content of the low resolution image but with higher resolution, and wherein the plurality of auxiliary images includes a second medium resolution image made blurry by a downsample operation and an upsample operation applied to the first medium resolution image;

obtain a plurality of feature vectors from the plurality of original images and from the plurality of auxiliary images;

combine, based on a plurality of indices, a higher resolution feature vector with a lower resolution feature vector, and generate a super resolution image based on the combined feature vectors.

* * * * *